United States Patent
Teglia et al.

(10) Patent No.: US 7,885,408 B2
(45) Date of Patent: Feb. 8, 2011

(54) PROTECTION OF SEVERAL IDENTICAL CALCULATIONS

(75) Inventors: Yannick Teglia, Marseille (FR); Pierre-Yvan Liardet, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 866 days.

(21) Appl. No.: 10/903,525

(22) Filed: Jul. 30, 2004

(65) Prior Publication Data
US 2005/0027998 A1    Feb. 3, 2005

(30) Foreign Application Priority Data
Aug. 1, 2003    (FR) .................................. 03 09577

(51) Int. Cl.
H04K 1/02    (2006.01)
H04K 3/00    (2006.01)
G06F 12/14    (2006.01)

(52) U.S. Cl. .......................... 380/252; 380/29; 708/230; 708/236; 708/491; 713/189; 713/193; 713/194

(58) Field of Classification Search ........................ None
See application file for complete search history.

(56) References Cited

U.S. PATENT DOCUMENTS

| | | | | |
|---|---|---|---|---|
| 5,933,501 | A * | 8/1999 | Leppek | 380/259 |
| 6,658,569 | B1 * | 12/2003 | Patarin et al. | 713/194 |
| 6,795,921 | B2 * | 9/2004 | Hayashi et al. | 726/33 |
| 6,970,561 | B1 * | 11/2005 | Obana | 380/28 |
| 7,092,523 | B2 * | 8/2006 | Pezeshki et al. | 380/28 |
| 7,127,620 | B2 * | 10/2006 | Boeckeler | 713/194 |
| 7,155,626 | B2 * | 12/2006 | Aikawa | 713/400 |
| 7,181,632 | B2 * | 2/2007 | Klug et al. | 713/320 |
| 2002/0166058 | A1 * | 11/2002 | Fueki | 713/194 |
| 2004/0025032 | A1 | 2/2004 | Chow et al. | |
| 2004/0030905 | A1 * | 2/2004 | Chow et al. | 713/189 |
| 2004/0059767 | A1 * | 3/2004 | Liardet | 708/491 |
| 2004/0071288 | A1 * | 4/2004 | Romain et al. | 380/37 |

FOREIGN PATENT DOCUMENTS

| | | | |
|---|---|---|---|
| WO | WO 00/39660 | * | 7/2000 |
| WO | WO 00 41356 A1 | | 7/2000 |

OTHER PUBLICATIONS

Yang, Shengqi, "Power Attack Resistant Cyptosystem Design: A Dynamic Voltage and Frequency Switching Approach," 2005, IEEE Computer Society, pp. 64-69.*
Standaert, Francois-Xavier, "On the Masking Countermeasure and Higher-Order Power Analysis Attacks," Information Technology: Coding and Computing, 2005, ITCC 2005, Apr. 4, 2005, vol. 1, pp. 562-567.*
French Search Report from French Patent Application 03/09577, filed Aug. 1, 2003.

* cited by examiner

*Primary Examiner*—Kaveh Abrishamkar
(74) *Attorney, Agent, or Firm*—Lisa K. Jorgenson; James H. Morris; Wolf, Greenfield & Sacks, P.C.

(57) ABSTRACT

A method for masking several identical functional processes manipulating digital data, including dividing the functional processes into steps at the end of each of which the process can be interrupted with the storage of at least one intermediary result, and successively executing the steps of at least two processes and selecting, at each step end, the process of the next step according to the result of a non-deterministic drawing of a number.

44 Claims, 1 Drawing Sheet

PROTECTION OF SEVERAL IDENTICAL CALCULATIONS

BACKGROUND OF THE INVENTION

1. Field of the Invention

The present invention relates to algorithmic processings performed on digital data manipulated by a microprocessor or an integrated circuit. The present invention more specifically relates to the processings performed on digital data in cryptographic ciphering or authentication applications implementing so-called secure algorithms. In such applications, the data manipulated by the algorithms and on which operations are performed must be protected against piracy, that is, external attacks aimed at discovering secret and/or calculation data.

2. Discussion of the Related Art

An example of an external attack against which the present invention aims at protecting relates to attacks known as SPA (single power analysis) or DPA (differential power analysis) attacks, which consist of analyzing the power consumption of the integrated circuit manipulating the data during execution of an algorithm. Indeed, when an integrated circuit (be it a microprocessor or an operator in wired logic) executes a calculation on data, the processing and the data have an effect upon its power consumption.

An example of an algorithm to which the present invention applies is the so-called RSA algorithm using the so-called Chinese remainder theorem (CRT) such as described, for example, in paper "The Chinese Remainder Theorem and its application in a high-speed RSA crypt-chip" by P. J. Grossschad, Computer Security Applications 2000 ACSAC'00, $16^{th}$ Annual Conference, 11-15 Dec. 2000, pages 384-393, which is incorporated herein by reference.

Conventionally, to mask the processing of one or several numbers, these numbers are combined with random quantities, before the algorithmic processing.

A disadvantage is that this modifies the processed number(s), which requires performing an inverse modification at the end of the processing to recover the expected result. Another disadvantage is that the masking by a random number increases the complexity of the processing as well as the duration of the entire calculation.

SUMMARY OF THE INVENTION

The present invention aims at providing a solution to mask the execution of algorithmic calculations. The present invention more specifically aims at providing a solution which is independent from the implemented algorithm, that is, which may apply whatever the executed calculations, provided that they can be divided into identical and locally independent processes.

The present invention also aims at providing a solution which does not adversely affect the speed of algorithm execution.

The present invention further aims at requiring no modification of the calculations performed by the actual algorithm.

To achieve these and other objects, the present invention provides a method for masking several identical functional processes manipulating digital data, comprising:

dividing the functional processes into steps at the end of each of which the process can be interrupted with the storage of at least one intermediary result; and successively executing the steps of at least two processes and selecting, at each end of a step, the process of the next step according to the result of a non-deterministic drawing of a number.

According to an embodiment of the present invention, said non-deterministic drawing is a random drawing.

According to an embodiment of the present invention, in case of an identity of the current drawing with the previous one, the same process remains executed for the current step, the other process being selected for the current step in case of a difference between the current drawing and the previous drawing.

According to an embodiment of the present invention, the drawing provides a number over one bit, the state of which conditions the changing or the maintaining of the functional process selection with respect to the previous step.

The present invention also provides a processor for executing identical functional processes dividable into steps at the end of each of which each process can be interrupted with the storage of an intermediary result, comprising means for selecting, according to the result of a non-deterministic drawing of a number, at least one functional process to be executed.

According to an embodiment of the present invention, said drawing provides a single bit, the state of which conditions the maintaining of the execution of the previous functional process or the switching to another functional process.

BRIEF DESCRIPTION OF THE DRAWINGS

The foregoing objects, features, and advantages of the present invention will be discussed in detail in the following non-limiting description of specific embodiments in connection with the accompanying drawing, which very schematically illustrates in the form of blocks an embodiment of the method of the present invention.

DETAILED DESCRIPTION

Figure 1:
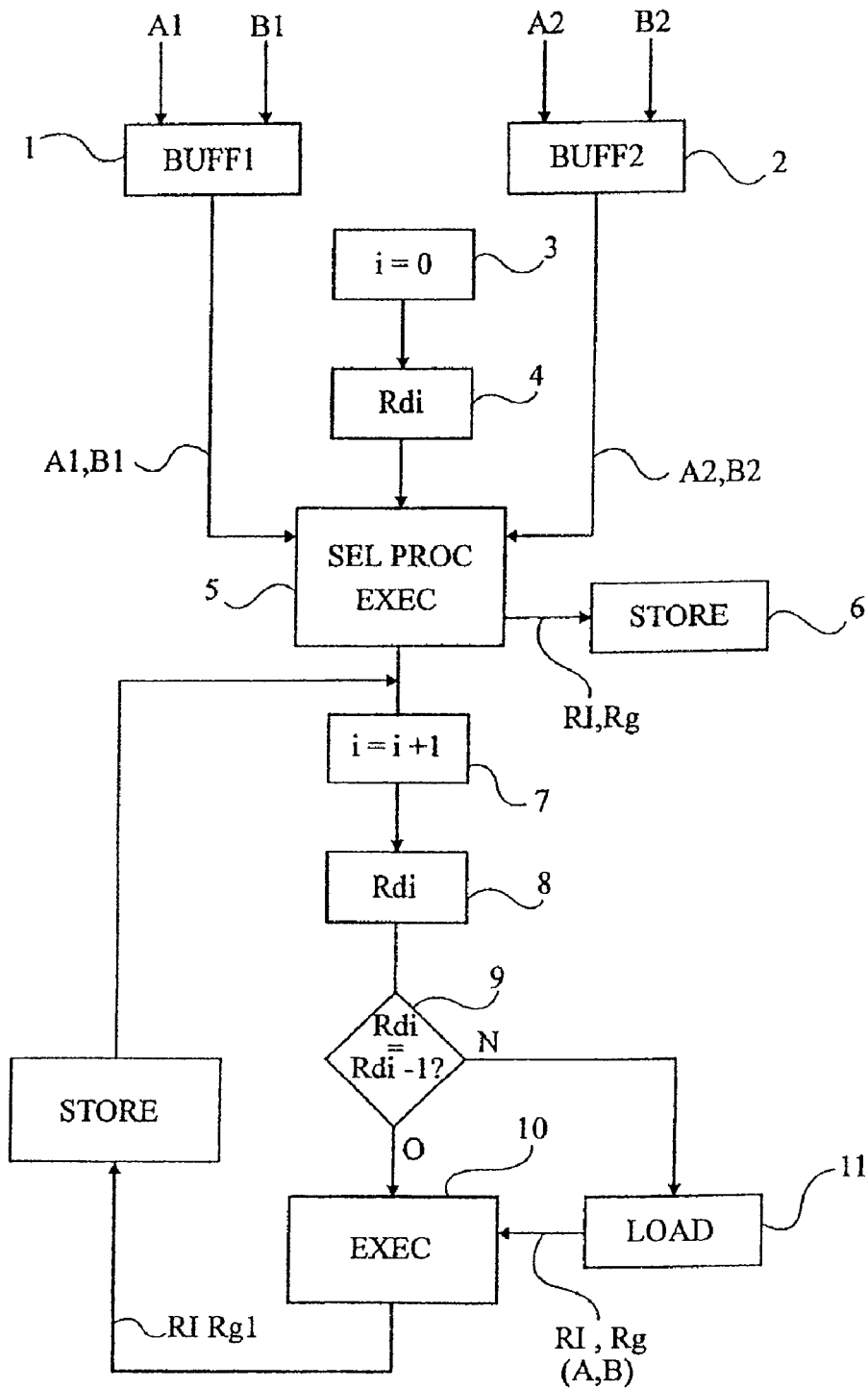

A feature of the present invention is to provide a random switching from one functional process to another, said processes implementing the same operations and being executed sequentially. According to the present invention, the functional processes are artificially divided into steps (each step corresponding, for example, to one or several elementary operations such as an addition, a multiplication, etc.) at the end of each of which it is possible to interrupt the process while storing one or several intermediary results. Each functional process, is in the meaning of the present invention, independent from the others, that is, no process masked by the present invention requires an intermediary result originating from another process to be masked. This condition is easily fulfilled by choosing, when the case arises, to gather in a single functional process in the meaning of the present invention several interlinked calculations. The data manipulated by the processes may be identical or different.

For clarity, the present invention will be discussed hereafter in relation with an application to two identical calculations (functional processes), each involving two input data and providing an output datum. It should however be noted that the present invention more generally applies to any number of identical calculations divided by steps and whatever the number of involved input and output data (one or several) and of intermediary results, provided to provide sufficient storage elements. Similarly, the present invention will be discussed referring to a random drawing to select the switching from one process to the other. However, it more generally applies to a non-deterministic drawing of a number (for example, pseudo-random or resulting from a calculation), that is, the result of which cannot be prejudiced.

The drawing illustrates an embodiment of the present invention applied to two identical calculations or functional processes PROC1 and PROC2, each implementing two numbers A1, B1, and A2, B2. These processes are divided into n steps each, an intermediary result being storable at the end of each step to enable interrupting and further restarting the calculation. The process division is performed, for example, upon writing thereof in software form by providing an interrupt at each step end. A similar division is possible in an implementation by a state machine in wired logic.

According to the present invention, upon initialization of processes PROC1 and PROC2, the initialization data (for example, the rank of the step to be performed—here, step 1) and operands A1, B1 and A2, B2 necessary to the calculations are stored (block 1, BUFF1 and block 2, BUFF2). The storage elements are, for example, formed of direct memory access (DMA) circuits which, preferably, are subsequently used to store the intermediary data of the calculations (next step and intermediary result(s)).

According to the present invention, a counter or the like is initialized (block 3, i=0). Then, a first random number is drawn (block 4, Rdi), in this example over one bit.

According to the drawn random number, one or the other of the processes (block 5, SEL PROC EXEC) is selected for execution of its first step. For example, for a number Rdi at 0, a step of process PROC1 is executed and for a number 1, a step of process PROC2 is executed. To execute this step, input data A1, B1, or A2, B2 of the selected process are loaded.

At the end of this step, intermediary result RI and rank Rg of the next (or current) step are stored (block 6, STORE) to enable subsequent restarting of the process at the right step. This storage is performed for one or the other of processes PROC1 or PROC2, for example, by using the storage elements BUFF1 or BUFF2 which are assigned thereto. Then, number i (block 7, i=i+1) is incremented to draw a new random number Rdi (block 8). This drawing is used to select that of processes PROC1 and PROC2 which will be subjected to the calculation at the next phase.

Preferably, a test (block 9, Rdi=Rdi−1 ?) with respect to the previous random number is performed. In case of an identity between the two numbers, the next step of the same process (block 10, EXEC) is executed. In the opposite case, it is switched to the other process. To achieve this, the necessary data are reloaded (block 11, LOAD). It the process has not been selected yet, said data are its input data A and B. Otherwise, they are an intermediary result and a step rank to restart the calculation at the right place in the algorithm.

At the end of the execution of step 10, it is returned to the incrementation of counter i (block 7), after having stored (block 12, STORE) the intermediary result and the rank of the process step which has just been executed.

Since each process must be executed in n steps, the number of passings in block 10 is 2n−1. Although this has not been shown, additional tests are provided to detect the end of the execution, to always select the same process whatever the result of the drawing in case of a non-equiprobable distribution of the drawings having led to a faster execution of one of the processes. As an alternative, the calculation of the ended process is continued with random data. This alternative is however not preferred since it requires being able to recover the calculation result in the end and causes a decrease in the general execution rapidity.

At the end of the calculation, the final result (stored as if it were an intermediary result) is present in the storage element assigned to the concerned process.

Thus, at each step end of a calculation process, there is a likelihood of switching or not according to the result of a random drawing, to the other process. It can be considered that the two calculation processes are randomly interlaced. Such an interlacing enables completely masking their execution.

It should be noted that the fact of not constantly assigning the result of a random drawing to one of the two processes makes the anti-piracy system even more robust.

The size of number Rdi is, in the example of the drawing, of a single bit since this embodiment provides an alternation between two calculations.

For the case where the number of calculation processes is larger than two, it may be provided, for example, at the switching from one process to another, to select the process according to the result of the random drawing. The size of number Rdi is a function of the number of processes.

An advantage of the present invention is that the fact that the execution of the two processes are interlaced optimizes the masking. Further, the application to identical functional processes enables using the same hardware circuit for both calculations, the data of which undergo the same operations. An examination of the integrated circuit power consumption then cannot enable tracing up the manipulated data since the present invention suppresses any correlation between the current calculation step and the functional process.

The fact that it is necessary to store the intermediary results to allow switching from one process to another is not disturbing since the intermediary results are different from one execution to another of a same calculation.

Of course, the present invention is likely to have various alterations, modifications, and improvements which will readily occur to those skilled in the art. In particular, the practical implementation of the present invention only requires conventional tools. For example, as compared to functional processes executing in parallel, the present invention conversely provides a temporary storage of the intermediary results of the different functional processes to enable switching from one to the other.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for masking several identical functional processes manipulating digital data, comprising:
    dividing the identical functional processes into steps at the end of each of which the process can be interrupted with the storage of at least one intermediary result, each of the identical functional processes comprising a series of operations, wherein identical functional processes comprise identical series of operations; and
    successively executing, with a processor, the steps of the identical functional processes and selecting, at each step end, the process of the next step according to the result of a non-deterministic drawing of a number wherein, in case of a match between a current number of a current drawing with a previous number of a previous drawing, a same process remains executed for a current step and, in case of a difference between the current number of the current drawing with the previous number of the previous drawing, another process is selected for the current step.

2. The method of claim 1, wherein said non-deterministic drawing is a random drawing.

3. The method of claim 1, wherein the drawing provides a one bit number, the state of which conditions the changing or the maintaining of the functional process selection with respect to the previous step.

4. A processor for executing identical functional processes dividable into steps at the end of each of which each process can be interrupted with the storage of an intermediary result, comprising:
  means for dividing the identical functional processes into steps at the end of each of which the process can be interrupted with the storage of at least one intermediary result, each of the identical functional processes comprising a series of operations, wherein identical functional processes comprise identical series of operations; and
  means for selecting, according to the result of a non-deterministic drawing of a number, at least one of the identical functional processes to be executed, wherein, in case of a match between a current number of a current drawing with a previous number of a previous drawing, a same process remains executed for a current step and, in case of a difference between the current number of the current drawing with the previous number of the previous drawing, another process is selected for the current step.

5. The processor of claim 4, wherein said drawing provides a single bit, the state of which conditions the maintaining of the execution of the previous functional process or the switching to another functional process.

6. The processor of claim 4, comprising:
  means for successively executing the steps of at least two identical processes and selecting, at each step end, the process of the next step according to the result of a non-deterministic drawing of a number.

7. An apparatus comprising:
  at least one processor to execute concurrently a plurality of identical processes, the processor adapted to:
    divide each of the plurality of identical processes into a series of steps, each of the identical processes comprising a series of operations, wherein identical processes comprise identical series of operations and each step of a series of steps corresponds to one or more operations of a series of operations,
    execute a first step for a first process of the plurality of identical processes, and
    execute a next step for a next process according to a randomly-generated number, wherein, in case of a match between a current randomly-generated number and a previous randomly-generated number, the next process is the first process and, in case of a difference between the current randomly-generated number and the previous randomly-generated number, the next process is a different process than the first process; and
  at least one computer-readable medium to store an intermediate value of a process following the execution of a step of the series of steps.

8. The apparatus of claim 7, wherein a step comprises one or more executable instructions of a process which calculate an intermediate value.

9. The apparatus of claim 7, wherein the at least one computer-readable medium further stores at least a plurality of series of steps to be executed by the processor, each of the plurality of series of steps uniquely corresponding to a process of the plurality of identical processes.

10. The apparatus of claim 7, wherein the randomly-generated number is a pseudo-randomly-generated number.

11. An apparatus comprising:
  a processor;
  at least one computer-readable medium storing at least two identical series of steps to be executed by the processor, each of the at least two identical series of steps uniquely corresponding to a process of at least two identical processes; and
  means for randomly selecting, following execution by the processor of a first step of a first process, a next step of a next process to be executed by the processor, wherein, in case of a match between a next process and the first process during the randomly selecting, the next process is the first process and, in case of a difference between the next process and the first process during the randomly selecting, the next process is a different process than the first process.

12. The apparatus of claim 11, wherein a step comprises one or more executable instructions of a process which calculate an intermediate value.

13. The apparatus of claim 11, wherein the at least one computer-readable medium stores at least one intermediate value calculated by a step following execution of the step.

14. The apparatus of claim 11, wherein the means for randomly selecting the next step selects the next step according to a randomly-generated number.

15. The apparatus of claim 14, wherein the randomly-generated number is a pseudo-randomly-generated number.

16. A method for concurrently executing a plurality of identical processes, the method comprising:
  dividing each of the plurality of identical processes into an identical series of steps;
  executing, with a processor, a first step of a first process of the plurality of identical processes; and
  executing a next step of a next process, the next process being selected according to a randomly-generated number, wherein, in case of a match between a current randomly-generated number and a previous randomly-generated number, the next process is the first process and, in case of a difference between the current randomly-generated number and the previous randomly-generated number, the next process is a different process than the first process.

17. The method of claim 16, further comprising storing in a computer-readable storage medium an intermediate value of the first process following the execution of the first step.

18. The method of claim 17, wherein the intermediate value is only stored in the computer-readable storage medium if the randomly-generated number is not a number corresponding to the first process.

19. The method of claim 16, further comprising generating the randomly-generated number following execution of a step.

20. The method of claim 19, wherein the randomly-generated number is a pseudo-randomly-generated number.

21. The method of claim 19, further comprising repeating the acts of generating the randomly-generated number and executing the next step of the next process according to the randomly-generated number until at least one of the plurality of identical processes completed.

22. The method of claim 16, further comprising associating each of the plurality of identical processes with a number.

23. The method of claim 16, wherein the next step of the next process is a second step of the first process.

24. The method of claim 16, wherein dividing each of the plurality of identical processes into the series of steps comprises determining whether a selected instruction of a process is an instruction which calculates an intermediate value.

25. The method of claim 16, wherein a step comprises one or more executable instructions of a process which calculate an intermediate value.

26. A method for concurrently executing a plurality of independent processes, the method comprising:
dividing each of the plurality of independent processes into a series of steps, none of the plurality of independent processes being reliant on any intermediary or final result originating from any other of the plurality of independent processes;
executing, with a processor, a first step of a first process of the plurality of independent processes; and
following executing of the first step, repeating executing, after a current step of a current process, a next step of a next process until at least one of the plurality of independent processes is completed, each next process being selected according to a randomly-generated number that is generated after the current step of the current process begins executing.

27. The method of claim 26, further comprising storing in a computer-readable storage medium an intermediate value of the first process following the execution of the first step.

28. The method of claim 27, wherein the intermediate value is only stored in the computer-readable storage medium if the randomly-generated number is not a number corresponding to the first process.

29. The method of claim 26, further comprising generating the randomly-generated number following execution of a step.

30. The method of claim 29, wherein the randomly-generated number is a pseudo-randomly-generated number.

31. The method of claim 29, further comprising repeating the acts of generating the randomly-generated number and executing the next step of the next process according to the randomly-generated number until at least one of the plurality of independent processes completed.

32. The method of claim 26, further comprising associating each of the plurality of independent processes with a number.

33. The method of claim 26, wherein the next step of the next process is a second step of the first process.

34. The method of claim 26, wherein dividing each of the plurality of independent processes into the series of steps comprises determining whether a selected instruction of a process is an instruction which calculates an intermediate value.

35. The method of claim 26, wherein a step comprises one or more executable instructions of a process which calculate an intermediate value.

36. An apparatus comprising:
a processor;
at least one computer-readable medium storing at least two series of steps to be executed by the processor, each of the at least two series of steps uniquely corresponding to a process of at least two independent processes, none of the at least two independent processes being reliant on any intermediary or final result originating from any other of the at least two independent processes; and
means for randomly selecting, following execution by the processor of a first step of a first process, a next step of a next process to be executed by the processor, the randomly selecting being done according to a randomly-generated number that is generated after the first step of the first process begins executing.

37. The apparatus of claim 36, wherein a step comprises one or more executable instructions of a process which calculate an intermediate value.

38. The apparatus of claim 36, wherein the at least one computer-readable medium stores at least one intermediate value calculated by a step following execution of the step.

39. The apparatus of claim 36, wherein the means for randomly selecting the next step selects the next step according to a randomly-generated number.

40. The apparatus of claim 39, wherein the randomly-generated number is a pseudo-randomly-generated number.

41. An apparatus comprising:
at least one processor to execute concurrently a plurality of independent processes, none of the at least two independent processes being reliant on any intermediary or final result originating from any other of the at least two independent processes, the processor being adapted to:
divide each of the plurality of independent processes into a series of steps,
execute a first step of a first process of the plurality of independent processes, and
following executing of the first step, repeating execution of a next step of a next process until at least one of the plurality of independent processes is completed, the next process being selected according to a randomly-generated number generated after each next step is executed; and
at least one computer-readable medium to store an intermediate value of a process following the execution of a step of the series of steps.

42. The apparatus of claim 41, wherein a step comprises one or more executable instructions of a process which calculate an intermediate value.

43. The apparatus of claim 41, wherein the at least one computer-readable medium further stores at least a plurality of series of steps to be executed by the processor, each of the plurality of series of steps uniquely corresponding to a process of the plurality of independent processes.

44. The apparatus of claim 41, wherein the randomly-generated number is a pseudo-randomly-generated number.

* * * * *